United States Patent
Bingham

(10) Patent No.: US 11,180,699 B1
(45) Date of Patent: Nov. 23, 2021

(54) SYSTEM AND METHOD FOR CONVERTING PLASTIC INTO DIESEL

(71) Applicant: Gen Tech PTD, LLC, Wichita, KS (US)

(72) Inventor: Richard A. Bingham, Meyersdal (ZA)

(73) Assignee: Gen Tech PTD, LLC, Wichita, KS (US)

( * ) Notice: Subject to any disclaimer, the term of this patent is extended or adjusted under 35 U.S.C. 154(b) by 0 days.

(21) Appl. No.: 16/916,949

(22) Filed: Jun. 30, 2020

Related U.S. Application Data

(60) Provisional application No. 62/869,159, filed on Jul. 1, 2019.

(51) Int. Cl.
  *C10B 53/07* (2006.01)
  *C10G 5/06* (2006.01)

(52) U.S. Cl.
  CPC .............. *C10B 53/07* (2013.01); *C10G 5/06* (2013.01); *C10G 2300/1003* (2013.01); *C10G 2400/04* (2013.01)

(58) Field of Classification Search
  CPC ............... C10G 2400/04; C10G 2300/1003
  USPC ......... 202/117, 208, 209, 265, 254; 422/547; 585/241
  See application file for complete search history.

(56) References Cited

U.S. PATENT DOCUMENTS

| | | | | |
|---|---|---|---|---|
| 5,744,668 A | * | 4/1998 | Zhou | C10G 1/10 585/241 |
| 6,822,126 B2 | * | 11/2004 | Miller | C10G 1/00 208/18 |
| 6,866,830 B2 | * | 3/2005 | Kwak | C10G 35/06 422/610 |
| 7,834,226 B2 | * | 11/2010 | Miller | C10G 45/08 585/240 |
| 8,450,552 B2 | * | 5/2013 | Hershkowitz | C04B 35/488 585/899 |
| 8,562,699 B2 | | 10/2013 | Pye | |
| 9,200,207 B2 | | 12/2015 | Huang et al. | |
| 2012/0310023 A1 | * | 12/2012 | Huang | C10G 1/10 585/241 |
| 2015/0152333 A1 | * | 6/2015 | Young | C10G 1/10 202/109 |
| 2016/0176781 A1 | * | 6/2016 | Hershkowitz | C07C 5/327 585/501 |
| 2016/0362609 A1 | * | 12/2016 | Ward | C10G 1/10 |
| 2018/0002609 A1 | * | 1/2018 | Narayanaswamy | C10G 1/02 |
| 2018/0355256 A1 | * | 12/2018 | Dooley | C10G 1/10 |
| 2019/0161683 A1 | * | 5/2019 | Narayanaswamy | B01D 3/143 |

(Continued)

*Primary Examiner* — Nina Bhat
(74) *Attorney, Agent, or Firm* — Erise IP, P.A.

(57) ABSTRACT

A system for producing primarily diesel with some heavy fuel from plastic feedstock is described. The feedstock is received into a pyrolizer. There are two zones in the pyrolizer—one where the temperature is elevated during conveyance, and a second where the temperature is maintained. A distillation vessel receives fuel oils from the pyrolizer and agitates the oils at high temperature. A hydrogenation vessel then mixes the fuel liquid with $H_2$ at a high pressure while recirculating to and from an expansion vessel to create converted fuel oil. A diesel distillation tank receives the converted fuel oil and creates diesel gas, which is then condensed to form a usable diesel product. Any remaining fuel oil is sent the heavy fuel oil tank.

5 Claims, 3 Drawing Sheets

(56) References Cited

U.S. PATENT DOCUMENTS

2019/0299491 A1* 10/2019 Stanislaus ................ C10K 1/32
2019/0367428 A1* 12/2019 Ramamurthy ........... C08J 11/12

* cited by examiner

US 11,180,699 B1

SYSTEM AND METHOD FOR CONVERTING PLASTIC INTO DIESEL

RELATED APPLICATIONS

This application claims the benefit of U.S. Provisional Application No. 62/869,159, filed Jul. 1, 2020. The disclosure of which is incorporated herein by reference.

BACKGROUND

1. Technical Field

This disclosure relates to the processing of waste matter into fuel. More specifically, this disclosure relates to a system and process for converting plastic articles into diesel and heavy fuel oil.

2. Discussion of Related Art

Plastics are widely used in numerous discarded products, but unlike many other materials, does not break down easily. Further, the use of plastics has increased greatly globally. Along with this increased usage, plastic waste has increased also—to the extent that plastics make up a very high percentage of waste materials. This high percentage along with a lack of biodegradability presents a big problem, especially considering the mass added to landfills.

Recycling typically requires elaborate sorting procedures, which can be very burdensome in terms of labor and management. Incineration has been used, but can result in the release of toxins into the environment, and does not allow for any useful second life for the waste.

Examples of kinds of recycling include plastic reconfiguring, e.g., where processes are executed on the waste materials enabling them to be reused as new similar plastic products. This can be done through extrusion, mechanical reconfiguration, the hybridization of the waste into new plastic materials, etc.

Plastic recycling can also involve the conversion of the waste at the chemical level into some other substance that is used to create new plastic materials or fuels. For example, U.S. Pat. No. 8,562,699 issued to Pye discloses a method of using pyrolysis to convert municipal plastic feedstock into gas for the purpose of generating electrical power. U.S. Pat. No. 9,200,207 discloses a method of reacting plastic feedstock with metal hydride and a catalyst to produce liquid hydrocarbons fuels.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

Disclosed is a system for producing diesel and heavy fuel oil from plastic feedstock. The system includes a feedstock-delivery system for reducing oxygen levels in the feedstock and delivering the feedstock into an entryway of a pyrolysis device. The pyrolysis device is configured to elevate the temperature of the feed stock upon receiving the feedstock through the entryway. Therein the feedstock is maintained in a substantially inert environment, and the feedstock is conveyed through two zones. In the first zone the feedstock temperatures are elevated, and in the second zone temperatures are maintained. Offtakes exist at different locations along the pyrolizer, and gases are delivered to condensers configured to convert the gases into fuel oils. A distillation vessel receives and heats the fuel oils to elevated temperatures while being agitated. Naphtha is removed and condensed. A hydrogenation vessel receives the remaining liquid fuel from the distillation vessel, the hydrogenation vessel mixes the fuel liquid with $H_2$ at a high pressure while any excess fuel oil from the process is recirculated to and from an expansion vessel to create ultra low sulphur converted fuel oils (e.g., diesel at less than 15 ppm Sulphur combined with heavy fuel oil at less than 50 ppm Sulphur). A diesel distillation tank receives the ultra low sulphur converted fuel oil from the hydrogenation vessel and reheats the converted fuel oil to the correct temperature to pull off the diesel gas. Next, a condenser receives the diesel gas and converts it into liquid which is received into a diesel receiving tank. The ultra low sulfur heavy fuel oil remaining once the diesel gas has been pulled off goes to a heavy-fuel oil receiving tank for receiving heavy fuel oil.

In embodiments, the system is configured to use heated air received from the pyrolysis device for other heat-consuming devices in the system. In embodiments, the other heat-consuming device is one of a heavy fuel oil receiving tank and a diesel oil receiving tank. In embodiments, the pyrolysis device includes: (i) a first heat circulation system including a first burner, the first heat circulation system configured to circulate air into the first zone in the pyrolysis device; and (ii) a second heat circulation system including a second burner, the second heat circulation system configured to circulate air into the second zone in the pyrolysis device. A direction of circulation of the first heat circulation system is opposite a direction of circulation of the second heat circulation system in embodiments.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions, objects and features may be exaggerated for clarity.

DETAILED DESCRIPTION

Figure 1:
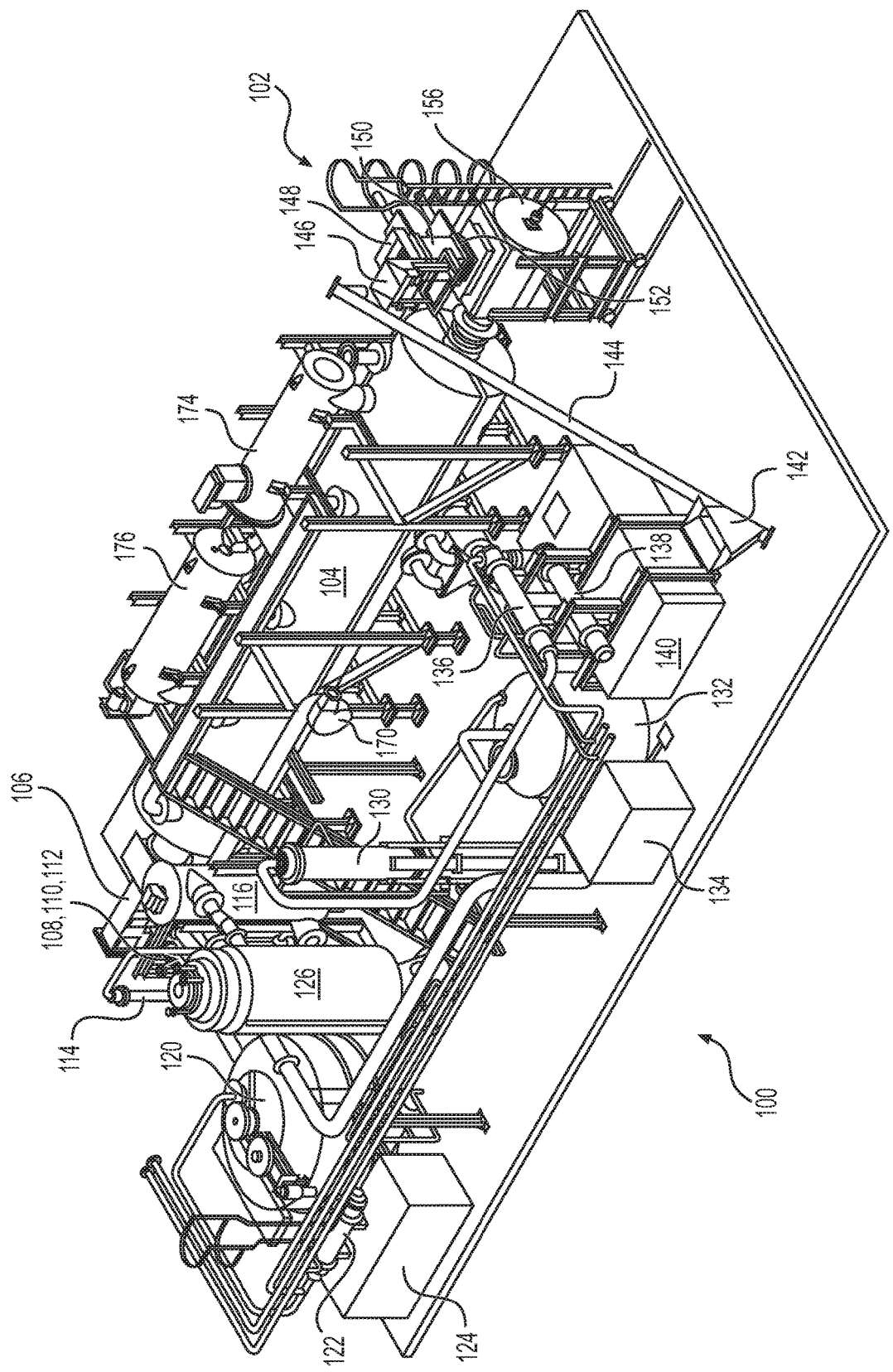
FIG. 1 shows a perspective view revealing an embodiment of a system for processing plastics into diesel and heavy fuel oil.

This disclosure relates to the processing of waste matter into fuel. More specifically, this disclosure relates to a system and process for converting plastic articles into diesel as well as heavy fuel oil, a general representation of which is shown in FIG. 1. Referring to the figure, an embodiment 100 for a system includes numerous components functioning together. The overall system shown in FIG. 1 includes plastics handling and retort portions, the details of which are shown in the FIG. 2 schematic, as well as refining equipment shown in detail in the schematic of FIG. 3. At a high level, system 100 includes a delivery system 102 for removing oxygen from and feeding stock into a pyrolyzer 104, wherein the feedstock undergoes pyrolysis. Those skilled in the art recognize that pyrolysis involves the degradation of the feedstock chemically at high temperatures in an inert environment where potential reagents (e.g., oxygen) have been removed. When the feedstock undergoes the process, solid, liquid (condensed), and gas products are produced. In the process herein, thermal depolymerization (TDP) occurs. Under pressure and heat, the pyrolysis breaks long chain polymers into short-chain petroleum hydrocarbons.

Pyrolyzer 104 includes first and second heating chambers 174 and 176. Gases are, in the pyrolyzer 104, captured from the feed stock from different stages or locations in the pyrolyzer, separately released to a discharge box 106, and then channeled to first, second, and third offtake condensers 108, 110, and 112 (only general position is disclosed in FIG. 1) which collectively offtake into intermediate tank 216. A fourth condenser 114 (FIG. 2) captures remaining condensate.

The refining side of the system uses a hydrogenator heating chamber 116 along with a hydrogenation reactor 126 primarily to remove sulphur from diesel produced. Also included is a first distillation vessel 120 for distilling naphtha from oil received from the pyrolizer (more specifically, from pyrolizer intermediate tank 216). A naphtha condenser 122 is designed to take naphtha gas and make a conversion to liquid to fill a naphtha tank 124. A diesel expansion vessel 130 receives the liquids from hydrogenation vessel 126, removes excess naphtha gas which is returned to the naphtha condenser 122, with the remaining liquids moving forward to be further separated into diesel and heavy fuel oil. Distillation vessel 132 elevates the temperature of processed liquids to separate the liquids into gas or final products. Gases are routed to the first diesel condenser 136 and a second diesel condenser 138 which are above a diesel tank 140. Tank 140 receives the diesel end product which is market ready. Heavy fuel oil tank 134 receives heavy fuel oil from the hydro-desulphurization treatment. Both diesel and heavy fuel oil are independently marketable.

Figure 2:
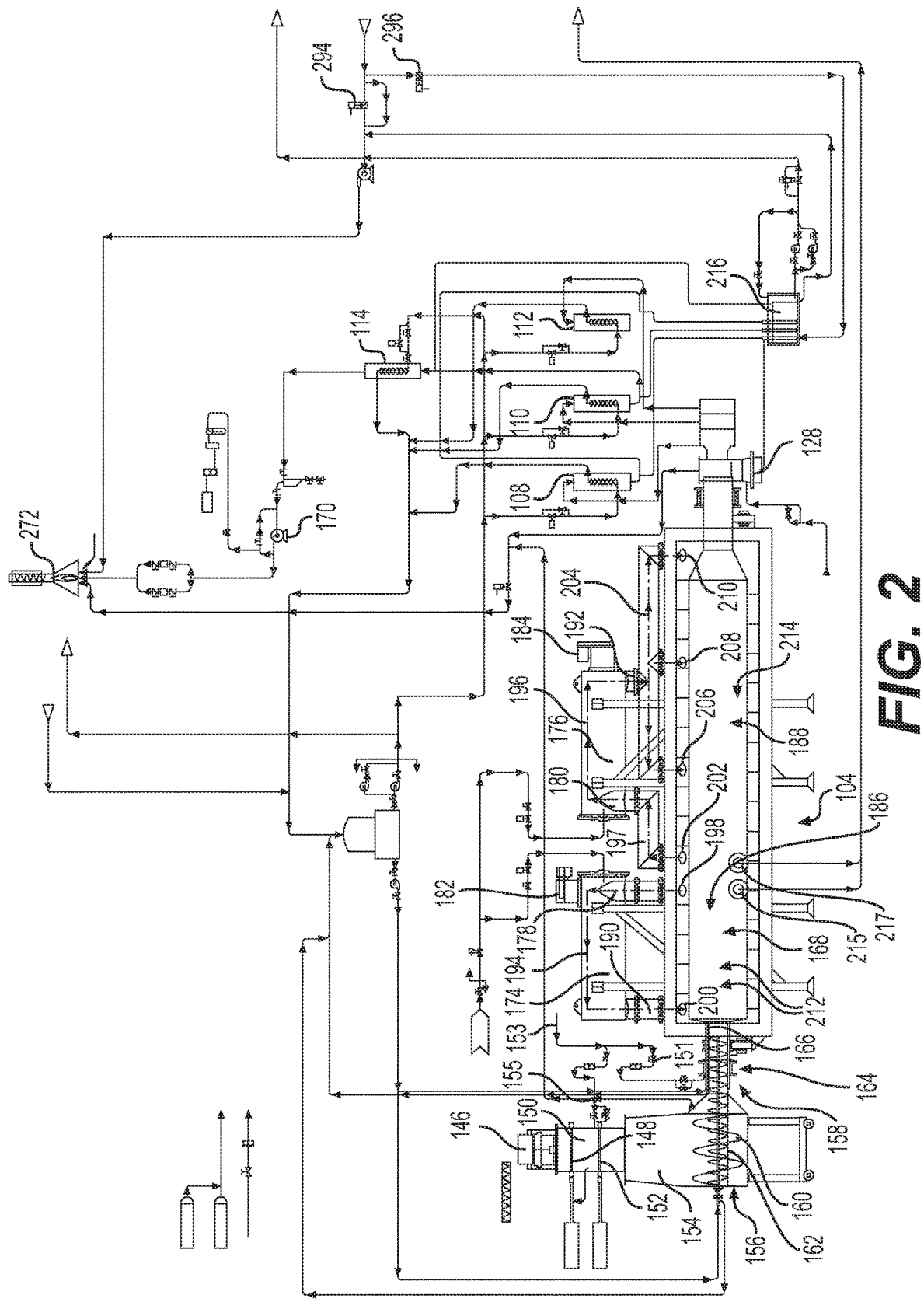
FIG. 2 shows a schematic representation of a plastic-feeding and pyrolysis side of the system shown in FIG. 1.

Plastic Feed and Pyrolysis (FIG. 2)

Delivery System 102

Referring first to FIG. 1, a system 100 includes a delivery system 102 used to feed plastic materials approximately four millimeters in size into a pyrolyzer feed system 142. The materials (not shown) are delivered to a weigh hopper 146 with a conveyor 144 that is driven by a variable speed drive arrangement (not shown). The tilting receptacle 146 directs the feed stock in a controlled fashion, to a weigh hopper 146. As the hopper 146 is filled, load cells (associated with the facilities computing equipment, e.g., PLC's, computers, microcontrollers) continually monitor weight. Once a predetermined weight is reached, the variable speed drive arrangement stops conveyor 144. Next, at the start of a predetermined timed loading sequence, a pneumatically controlled actuator tips the weigh hopper 146 releasing the feed stock into the area onto the face of a pneumatic gate valve 148 (FIG. 2). The weigh hopper 146 then returns to the upright loading position (shown in FIG. 1) for reloading and pneumatic gate valve 148 closes above the materials which have dropped into a feed air lock compartment 150 defined between valve 148 and a lower gate valve 152. Nitrogen is then introduced into compartment 150 for a predetermined period of time to purge the chamber and create an anaerobic environment. Once the materials have been adequately exposed to the nitrogen, lower gate valve 152 opens, and the treated materials drop into the internal chamber 154 defined by a feed hopper 156. Hopper chamber 156 is continually filled according to this repeated process, thus presenting a steady source of oxygen free feedstock.

In embodiments, the gate valves are controlled using position sensors and pneumatic cylinders which are provided to operate each of gates 148 and 152. The position sensors are monitored by the facility computing system, and gates 148 and 152 achieve their required sequence positions so that a series of equally-weighted material portions are repeatedly and continually dropped into chamber 150, treated with nitrogen (which is introduced via a first source line 153) and then dropped into the hopper chamber 154 (FIG. 2).

Feed hopper 156 is equipped with a water-cooled feed screw conveyor 158 (FIG. 2). The motor driven screw conveyor 158 runs continuously while the loading sequence is in operation. Additionally, conveyor 158 has a large helical section 160 and a relatively smaller helical section 162. Large section 160 compels the dropped materials from the chamber 154 through a more narrow retort section 164. Narrow section 164, which has internal surfaces 166, leads into the pyrolyzer 104. The narrow section 164 is water cooled using relatively cool water from elsewhere in the plant.

A second branch 151 of nitrogen line 153 is used to introduce nitrogen into the narrow section 164 to purge oxygen levels if those levels exceed a predetermined level. A plant computing system measures oxygen levels in the retort section 164, and if levels are too high for the upcoming pyrolyzing process, nitrogen introduction will be increased until the percentage of oxygen is dropped to an ideal level (e.g., below 2-3%).

Pyrolyzer 104

The pyrolyzer 104 processes feedstock by utilizing heat along with rotation and translation. Those skilled in the art know that this sort of device often has an internal screw type helical fighting 168 (a/k/a, an internal scroll or auger) that is included inside of the vessel. The screw fighting 168 is turned to progress the product through the device (from right to left in FIG. 1, and from left to right in FIG. 2), and as it progresses, the plastic feed stock is converted into fuel oil, vapor and synthetic gas. Each are exacted from the system using suction provided by suction fan 170. On FIG. 2, fan 170 creates a system vacuum which pulls the vapor and gas into condensers, which convert into liquid fuel oils. Any remaining gaseous fraction is either used in the package burners, used for other heating processes or is passed through to a flue 272 where it can be released with appropriate emissions controls. See FIG. 2.

Heating Chambers 174 and 176

The pyrolyzer heating chamber is heated initially and secondarily by burners in heating chambers 174 and 176. A package burner is installed in each chamber (e.g., burner 178 and burner 180). Burners 178 and 180 are fired using either Liquified Petroleum Gas (LPG), synthetic gas, or naphtha, optionally derived from elsewhere in the plant. The heated products are circulated using a first fan 182 and a second fan 184. Fan 182 circulates heated products (removed from the feedstock) through a first heating zone 186 in the pyrolyzer heating chamber, which is where the temperature of the feed stock is gradually increased, and fan 184 circulates products through a later second zone 188 in the pyrolyzer where the feed stock is maintained at substantially a constant temperature. The internally generated effluents are returned to heating chambers 174 and 176 in continuous cycles via the fans 182 and 184. The temperature set point for each of the process retort heating chamber zones is controlled by individual temperature transmitters that are installed in each of the heating chamber circulation exit pipes 190 and 192. The transmitters transmit signals to the plant computer system, e.g., using one or more Programmable Logic Controllers (PLCs), or some other computer-controlled system. The temperatures are settable through a user interface, e.g., HMI on the system.

As can be seen in FIG. 2, the first and second heating chambers conduct the heated products in first and second opposite directions 194 and 196. More specifically, heating chamber 174 conducts air into intake port 198 and exits through port 200, creating first flow direction 194 which is counter clockwise relative to the translation direction of feed stock in the pyrolyzer. The circulation through heating chamber 176, however, is conducted in a second clockwise direction 196 relative to the translation of feed stock. More specifically, the subsystem intakes at a port 202 into duct 197, and then into the heating chamber 176. Upon leaving chamber 176, heated products are then delivered into a common manifold 204. Manifold 204 branches to three distinctly spaced-apart ports 206, 208, and 210, each of which introduce the heated products at different locations along the length of the pyrolyzer.

Feed Stock Conveyance, and Gas Offtakes

The rotating process retort has an internal scroll (auger) attached to the inside of the retort wall. This scroll progresses the product through the pyrolyzer and is driven by a motor, which is controlled via a variable speed drive system. In embodiments, there are three differently positioned gas off takes (not shown) which are located at different stages along the length of the pyrolyzer. By staging withdrawal at three distinct locations, particular sorts of gases are able to be directed to three different offtake condensers, a first condenser 108, a second condenser 110, and a third condenser 112.

Any vapor and gases that are not condensed in the first series of condensers (108, 110 and 112 on FIG. 2) are captured in 114.

Figure 3:
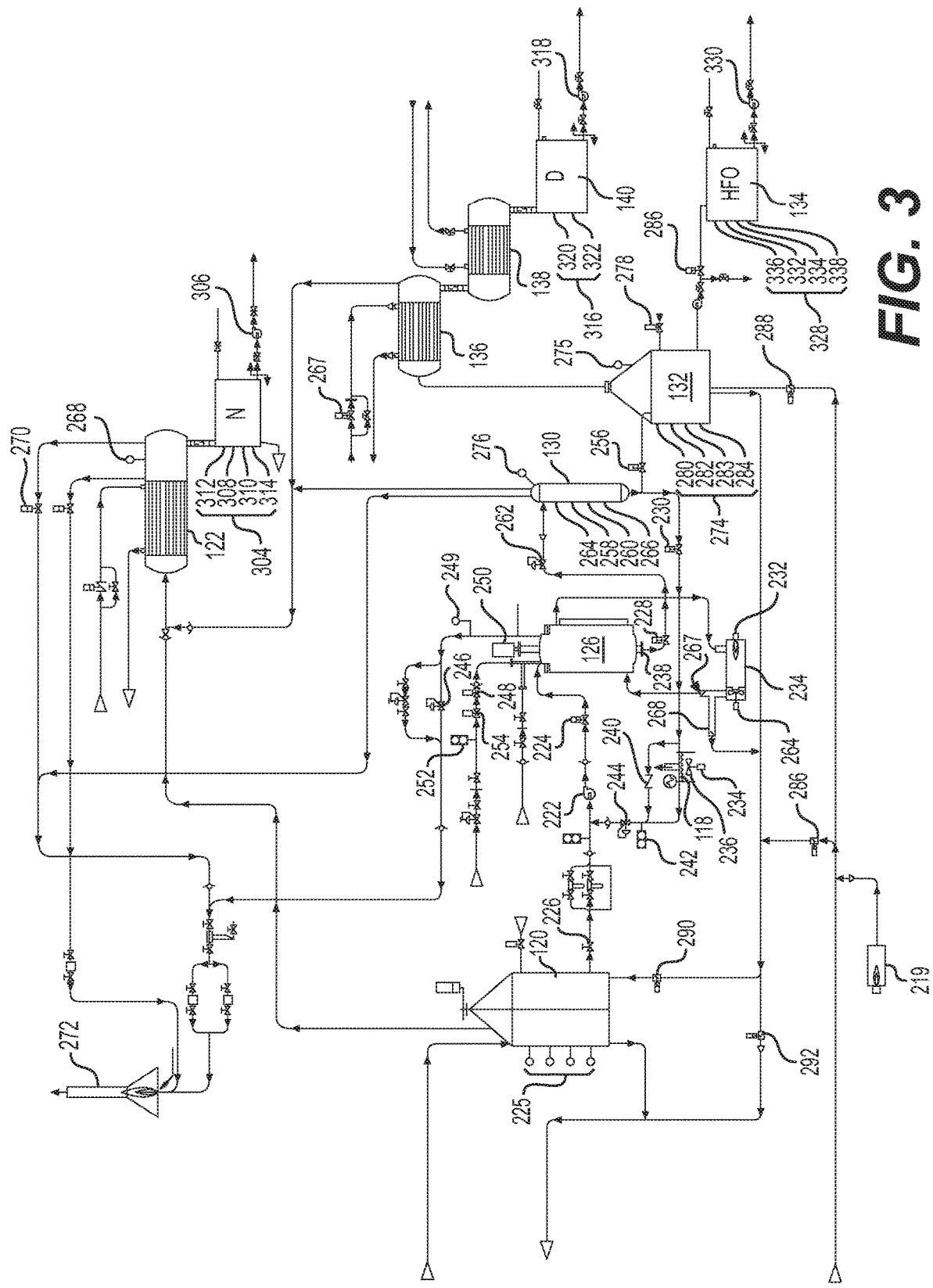
FIG. 3 shows a schematic representation of primarily the refining sections of the system depicted in FIG. 1.

Refining (FIG. 3)

Also described herein is a system which incorporates various methods to convert the fuel oil that is received from the pyrolyzer into diesel, heavy fuel oil and other usable fuels. The refining features are shown primarily in FIG. 3. Referring to the figure, it can be seen that the oil is delivered from the pyrolyzer intermediate tank 216 (in FIG. 2), which collects liquids from each of the condensers 108, 110, 112, and 116 (in FIG. 2), and delivers the combined fuel oil to distillation tank 120 (in FIG. 3). In distillation tank 120, the oil is heated to a moderately elevated temperature while being continuously mixed with a stirring system. Any gaseous naphtha product created while at elevated temperatures in tank 120 is delivered to the naphtha water cooled condenser 122.

The remaining liquid fuel is delivered to the high pressure hydrogenation vessel 126 where it is mixed with $H_2$ at a high pressure while being circulated, while being first heated, and then if required, cooled due to the exothermic nature of the process. An ideal temperature is maintained until the activation is complete. During activation any liquid created during the process is delivered to an expansion vessel 130 and circulated continuously back to hydrogenation vessel 126. Any naphtha that is circulated to the expansion tank 130 is received by the water cooled condenser 122. The converted fuel oil that remains is delivered on a level switch controlled basis to the diesel distillation tank 132, where it is reheated, and the diesel comes off the distillation vessel and is received by the diesel condensers 136 and 138. Should any product remain in the diesel distillation tank 132 it will be transferred to the plant's heavy fuel oil storage tank 134.

Distillation Tank 120 and Condenser 122

The distillation tank 120 is equipped with a stirrer motor 218 for mixing received fuel oil from the pyrolyzer intermediate storage tank 216 (FIG. 2). The distillation vessel 120 is pressure and temperature controlled. Naphtha product removed post hydrogenation from the expansion tank is received by a water cooled condenser 122, where it is condensed and delivered to naphtha storage tank 124 (FIG. 1). The cooling water flow to condenser 122 is controlled by a thermocouple that is situated in the naphtha storage tank 124. The thermocouple opens and closes a butterfly valve in damper 290 to obtain a temperature set point. The heated air, as will be discussed hereinafter, is received from the pyrolyzer exhaust ports 215 and 217 and/or other burners in the plant (e.g., burner 219, burner 232 of heating chamber 116).

A pressure transmitter controls the pressure in condenser 122 by modulating a butterfly valve 267 within a pre-set range and allowing the non-condensable product to pass through to the exhaust stack.

Hydrogenation Vessel (Hydrotreater)

The hydrotreater 126 is equipped with a hydrogen fuel oil mixing system that is driven by a motor 250. When an initial fill of the hydrotreater is required, the fuel oil in 120 is delivered to the hydrogenation vessel 126 by fuel pump 222. In order to do this, fuel pump 222 is started and valves 224 and 226 are opened. When the required level is indicated by a level transmitter associated with hydrotreater 126, valve 226 closes and valves 228 at the hydrotreater base, and 230 at the base of the expansion tank 130, open. This action allows the fuel oil to circulate, while being heated or cooled to maintain the required set point temperature. The reaction of the injected hydrogen with the fuel oil generates heat, and when this exothermic reaction stops, additional heat is supplied to the hydrotreater casing by burner 232, which is situated in a heating chamber 234.

Fuel oil in the hydrotreater 126 is heated by the hydrogenation heating chamber 234 as it is being circulated. High temperature air from the hydrogenation heating chamber 234 is delivered to the hydrotreater 126 by a variable speed driven fan 264. A temperature set point indicated and controlled by temperature control 238. A valve 240 allows a controlled amount of the converted fuel oil (received from the expansion—vessel 130) to bypass the heat exchanger 118 at a varied amount. This valve 240 is controlled by temperature controller 238 and allows greater bypass when the fuel oil is below temperature set point and a lesser bypass when the fuel oil is over a temperature set point.

A flow meter 242 monitors the fuel oil flow back into the hydrotreater 126 by controlling flow control valve 244.

Before the initial filling, hydrogenation vessel 126 is purged with $N_2$ to remove any air. During filling, the pressure in the hydrotreater 126 will increase as the fuel pump 222 delivers the fuel oil from the primary distillation vessel 120. A pressure transmitter 244 controls the pressure by modulating control valve 246 to allow nitrogen to escape to the plant exhaust stack during filling.

Once the hydrotreater 126 is full, a mixing motor 250 is started (via the facilities systems) by an operator. Next, hydrogen is introduced into the hydrotreater 126 by opening a globe valve 248. This allows flow, and a flow meter 252 operates in conjunction with a flow valve 254, until an operating pressure is reached. When the pressure transmitter 244 indicates the operating pressure, valve 254 closes and the pressure control function becomes active. The pressure transmitter 244 maintains a pressure by controlling flow valve 254 and pressure control valve 246. Naphtha still present in the converting product is sent to naphtha condenser 122.

Continuous Operation

After the initial filling and conversion of the fuel oil is achieved, the system is put into continuous mode by the operator. In continuous mode the valve 226 at the exit of the first distillation tank 120 is opened and a controlled amount of fuel oil is added to the conversion circulation system. To avoid over filling of the circulation conversion system, the converted product is delivered to the diesel distillation tank 132 by opening valve 256. The opening and closing of valve 256 is controlled by the high and low level switches 258 and 260 in expansion tank 130. The positions of level switches 258 and 260 do not interfere with the level positions in the hydrotreater 126.

During the circulation of the fuel oil, the pressure in the expansion tank 130 is controlled between 4 and 5 bar by a pressure control valve 262.

The heating of the fuel oil to the required set point is achieved by two means; the activation of the hydrogen with the fuel oil and the heating of the fuel oil by the package burner 232 in heating chamber 234. A high temperature circulation fan 264 provides the circulation around the heating system.

There are first and second dampers 267 and 268 in the circulating heating system. These are opened and closed at set point by pneumatic actuators. While heating to set point, second damper 268 is closed, and first damper 267 is opened up. When a set point is achieved, second damper 268 is opened up, and first damper 267 is closed. When heat is again required, this actuator sequence is reversed.

Expansion Tank 130

The expansion tank 130 is equipped with two level switches 258 and 260 which are used to control the fuel level of oils that have been hydrotreated in vessel 126. A pressure transmitter 276 monitors and controls the vessel pressure by modulating the pressure control valve 262.

Expansion Tank 130 receives the fuel oil from the hydrotreater 126 at a reduced pressure in the region of 4.5 to 5 bar. The pressure is reduced to this range by the pressure control valve 262 that is situated behind valve 228. Due to the temperature at which the fuel is received, any naphtha that is still present is a gas which immediately leaves the tank and is delivered to the naphtha condenser 122.

A high, high level setting 264 will close valve 226 of the distillation tank 120 to prevent overfilling and cannot be reopened until the fuel level drops below the high level setting. If valve 226 was closed by the high, high command 264 it can only be reopened when the fuel level drops below the low level switch 260 indicated level.

Upper Diesel (Preliminary) Condenser

The product which moves from the hydrogenation vessel and expansion tank to the diesel distillation vessel 132, is ultra low sulphur fuel that is principally diesel with some heavy fuel oil. The ultra low sulphur fuel (e.g., less than 15 ppm sulphur) is transferred to the diesel pre-condenser 136 and cooled to an appropriate temperature.

Pressure transmitter 268 situated on naphtha condenser 122 monitors and controls the pressure in the condenser system using a modulating valve 270 which will release any non-condensable products to the plant exhaust 272.

Lower Diesel Condenser

After passing through upper diesel water-cooled pre-condenser 136 the ultra-low sulphur fuel (e.g., less than 15 ppm diesel) is transferred to a free flowing water cooled condenser 138 where the diesel is cooled to ambient. One condenser takes off any remaining gas and naphtha, the other entrains the diesel fraction.

Diesel Distillation Vessel

Diesel distillation vessel 132 includes a 4-position level switch 274 which monitors and controls the hot diesel product level. A pressure transmitter 275 monitors the vessel pressure by opening solenoid valve 278 on a nitrogen injection line if the pressure drops below the pre-set range. Distillation vessel 132 receives the diesel product from the expansion tank 130 and due to the temperature of the product upon introduction into vessel 132, the diesel product starts being moved immediately. Therefore, the level increase, if any, is relatively slow and should not exceed the pre-set high level that is indicated by the 4-position level switch 274.

A high, high level setting 280 will close valve 256 to prevent overfilling. It cannot be reopened until the fuel level drops below the high level setting 282. If valve 256 was closed by the high, high command 280, it can only be reopened by the operator.

If the entire received product is diesel, it will all move to the diesel tank and the low, and low, low commands (283 and 284) will always be indicated. Should these low, low settings not indicate, then a discharge valve 286 opens and allows flow to the heavy fuel oil (HFO) collection tank 134 until the low, low setting 284 is active.

Heavy Fuel Oil and Diesel Oil Receiving Tanks (134 and 140) are Heated Using Pyrolyzer Exhaust The heavy fuel oil (HFO) and diesel (D) oil receiving tanks, 134 and 140, are heated to their operating temperatures using the exhaust heat from the pyrolyzer 104 and a backup support burner heating system. Disclosed is an arrangement that utilizes pneumatic damper valves 286, 288, 290, and 292 (all in FIG. 3) as well as damper valves 294 and 296 in FIG. 2. These damper valves are fitted to the heating systems and are controlled by the local thermocouples acting in cooperation with the facilities computing and control systems. The arrangement is used to direct the hot exhaust gasses to the heated fuel oil tank 134, the primary distillation tank 120, and the diesel distillation tank 132 when required.

The pneumatic damper valve arrangement is operated as follows: a thermocouple arrangement controls pneumatic valves 290 and 292 at set point. If pneumatic valve 290 closes at set point, valve 292 will open. The reverse action takes place if pneumatic valve 290 opens. Similarly, a thermocouple arrangement controls valves 286 and 288 at set point. If 288 closes at set point valve 286 will open. The reverse action takes place if valve 288 opens. Further, a thermocouple arrangement controls valves 294 and 296 at set point (see FIG. 2).

Naphtha Tank 124 Controls

The level control switches 304 on the Naphtha (N) tank 124 will start the naphtha fuel pump 306 when the high level switch 308 is activated. Naphtha pump 306 will stop when the low level switch 310 is deactivated.

If the high, high position switch 312 is activated, or if the low, low position switch 314 is deactivated, the plant alarm is triggered.

Diesel Tank 140 Controls

The level control switches 316 on the diesel tank 140 will start a diesel fuel pump 318 when a high level switch 320 is activated. Diesel fuel pump 318 will stop when a low level switch 322 is deactivated.

Heavy Fuel Oil Tank 134 Controls

A group of level control switches 328 (including high, high level switch 336, high level switch 332, low level switch 334, and low, low level switch 338) on the heavy fuel oil tank 134 will start a heavy fuel oil fuel pump 330 when a high level switch 332 is activated. The pump 330 will stop when a low level switch 334 is activated.

While the present disclosure has shown and described exemplary embodiments, it will be understood by those of ordinary skill in the art that various changes in form and details may be made therein without departing from the spirit and scope of the present disclosure, as defined by the following claims.

The invention claimed is:

1. A system for producing diesel from plastic feedstock, the system comprising:
   a feedstock-delivery system for reducing oxygen levels in the feedstock and delivering the feedstock into an entryway of a pyrolysis device;
   the pyrolysis device configured to elevate the temperature of the feed stock upon receiving the feedstock through the entryway, then maintain the feedstock in a substantially inert environment, and convey the feedstock through a first zone in which feedstock temperatures are elevated, and a second zone where temperatures are maintained, the pyrolysis device including offtakes positioned at different locations then delivered to a plurality of condensers, the condensers converting gases received from the pyrolysis device into fuel oils;
   a distillation vessel receiving and heating the fuel oils to an elevated temperature while being agitated and removing naphtha;
   a hydrogenation vessel receiving remaining liquid fuel from the distillation vessel, the hydrogenation vessel mixing the fuel liquid with $H_2$ at a high pressure while being recirculated to and from an expansion vessel to create converted fuel oil;
   a diesel distillation tank receiving the converted fuel oil from the hydrogenation vessel and reheating the converted fuel oil to create diesel gas;
   at least one condenser configured to receive the diesel gas and convert the diesel gas into liquid diesel which is received into a diesel receiving tank; and
   a heavy-fuel receiving tank for receiving heavy fuel oil received from the diesel distillation tank.

2. The system of claim 1 wherein the system is configured to use heated air received from the pyrolysis device for at least one other heat-consuming device in the system.

3. The system of claim 2 wherein the at least one other heat-consuming device is one of a heavy fuel oil receiving tank and a diesel oil receiving tank.

4. The system of claim 1 wherein the pyrolysis device comprises:
   a first heat circulation system including a first burner, the first heat circulation system configured to circulate air into the first zone in the pyrolysis device;
   a second heat circulation system including a second burner, the second heat circulation system configured to circulate air into the second zone in the pyrolysis device.

5. The system of claim 4 wherein a direction of circulation of the first heat circulation system is opposite a direction of circulation of the second heat circulation system.

* * * * *